US008219288B2

(12) United States Patent
Schulter et al.

(10) Patent No.: US 8,219,288 B2
(45) Date of Patent: Jul. 10, 2012

(54) METHOD FOR POSITIONING A MOBILE UNIT IN A MOTOR VEHICLE

(75) Inventors: Wolfgang Schulter, Meersburg (DE); Thomas Öxle, Markdorf (DE)

(73) Assignee: Coni Temic Microelectronic GmbH, Nuremberg (DE)

( * ) Notice: Subject to any disclaimer, the term of this patent is extended or adjusted under 35 U.S.C. 154(b) by 515 days.

(21) Appl. No.: 12/063,450

(22) PCT Filed: Aug. 1, 2006

(86) PCT No.: PCT/DE2006/001338

§ 371 (c)(1),
(2), (4) Date: May 24, 2010

(87) PCT Pub. No.: WO2007/016900

PCT Pub. Date: Feb. 15, 2007

(65) Prior Publication Data

US 2010/0228446 A1 Sep. 9, 2010

(30) Foreign Application Priority Data

Aug. 9, 2005 (DE) ........................ 10 2005 037 471

(51) Int. Cl.

| | |
|---|---|
| ***B60R 22/00*** | (2006.01) |
| ***E05F 15/00*** | (2006.01) |
| ***G05D 1/00*** | (2006.01) |
| ***G05D 3/00*** | (2006.01) |
| ***G06F 7/00*** | (2006.01) |
| ***G06F 17/00*** | (2006.01) |

(52) U.S. Cl. ........................................................ 701/49

(58) Field of Classification Search .................... 701/49
See application file for complete search history.

(56) References Cited

U.S. PATENT DOCUMENTS

| | | | | |
|---|---|---|---|---|
| 4,506,378 | A | 3/1985 | Noso et al. | |
| 4,801,812 | A | 1/1989 | Brusasco | |
| 5,497,326 | A * | 3/1996 | Berland et al. | 701/36 |
| 5,955,854 | A * | 9/1999 | Zhang et al. | 318/480 |
| 2003/0047430 | A1 * | 3/2003 | Rantet | 200/5 R |
| 2003/0111995 | A1 | 6/2003 | Otte | |
| 2003/0122516 | A1 | 7/2003 | Mukai et al. | |
| 2004/0154904 | A1 | 8/2004 | Varga | |
| 2005/0099263 | A1 * | 5/2005 | Ikeda | 340/5.62 |
| 2005/0119792 | A1 | 6/2005 | Maistre et al. | |
| 2005/0261815 | A1 * | 11/2005 | Cowelchuk et al. | 701/36 |
| 2006/0009892 | A1 | 1/2006 | Seeberger et al. | |
| 2006/0052919 | A1 * | 3/2006 | Hong et al. | 701/29 |
| 2006/0155439 | A1 * | 7/2006 | Slawinski et al. | 701/35 |

FOREIGN PATENT DOCUMENTS

| | | |
|---|---|---|
| DE | 196 30 189 | 1/1998 |
| DE | 199 25 180 | 10/2000 |
| DE | 101 61 434 | 6/2003 |

* cited by examiner

*Primary Examiner* — Mary Cheung
*Assistant Examiner* — Michael D Lang

(57) ABSTRACT

Disclosed is a method for positioning a mobile unit in a motor vehicle. The mobile unit is driven by an external force and equipped with an electronic jamming protection device. A tactile input unit is provided for positioning the mobile unit. An occupied position of the mobile unit is stored under certain conditions, whereby said stored position is automatically approached when the tactile unit is correspondingly operated.

23 Claims, 2 Drawing Sheets

METHOD FOR POSITIONING A MOBILE UNIT IN A MOTOR VEHICLE

This application is the U.S. national phase of international application PCT/DE06/01338 filed Aug. 1, 2006, which designated the U.S. and which claims the benefit of priority of German Patent Application Number 10 2005 037 471.9 filed Aug. 9, 2005. The contents of each of the aforementioned documents are incorporated herein in their entirety.

BACKGROUND OF THE INVENTION

The invention relates to a method for positioning a mobile unit driven by an external force in a motor vehicle as well as an apparatus for implementing the method.

When opening and closing a mobile unit driven by an external force, in particular a windowpane of a motor vehicle by means of a mobile unit driven by an external force, in particular by means of a motor vehicle window lift, it is of special importance to always know the current position of the mobile unit driven by an external force and to monitor the latter in its movement as position-exactly as possible, in order to ensure a secure base for the functionality of a jamming protection device. For this purpose mostly the position of the mobile unit driven by an external force is standardized. In case of such mobile units driven by an external force the drive is automatically switched off and if applicable is reversed, if the mobile unit driven by an external force meets in its movement an obstacle, which is located between the mobile unit driven by an external force and in particular the framework, in which the mobile unit driven by an external force moves. Here, however, there is the problem that when approaching the mobile unit driven by an external force into the closing region of the mobile unit driven by an external force due to the resistance exerted by the sealing, which is arranged at the framework, against the adjustment movement of the mobile unit driven by an external force, said resistance can be interpreted as a jamming protection situation. Furthermore, it is difficult to approach a predefined position of the mobile unit driven by an external force and to store this position and at the same time to offer the possibility to approach this position repeatedly.

From DE 100 28 038 A1 a method is known to determine the position of an element driven by the drive shaft of a direct current motor within a pre-determined motion distance between two block positions. The position is determined by evaluating the current ripples contained in the armature current signal.

In this context, when moving the driven element into a defined block position a standardization by the system is effected. When approaching the driven element into a block position the direct current motor is disconnected from the mains before reaching the block position defined by the system and is again actuated after a pre-determined period of time for ultimately approaching the driven element into the block position. After the driven element was brought into its mechanically defined block position, this block position is standardized by the system. This standardization at the upper mechanical stop of the driven element is supposed to counteract against the possibility, which exists, if a closing system with different kinetic energy, i.e. with different speed, drives against a mechanical stop. By this different kinetic energy the point of reference can shift, in particular in case of a soft, slightly resilient mechanical stop. This results in inaccuracies of the reference position. Thus, substantial difficulties arise to approach a position of free choice between the two final positions or block positions.

From DE 102 58 476 A1 a method is known for the position-dependent control of an adjusting element movable by means of an electrically driven adjusting device for the motor vehicle. Here, the adjusting device evaluates a majority of different operating modes and characteristics of a drive signal to the adjusting device, in particular by the ripples of the drive current, for identifying the position of the element. It is provided that a parameter affecting the drive movement of the adjusting device and/or a characteristic value characterizing the adjusting device is evaluated to determine an error value of the determined position of the adjusting element and that the operating modes of the adjusting device are controlled depending on the determined error value. The position is determined by means of a counting of the current ripples. This type position determination is very sensitive in case of certain conditions, for instance motor starts, high loads, fluctuations of the vehicle electrical system, variations in temperature, aging etc. amount to inaccuracies.

From DE 102 36 650 A1 an operating device for a window lift is disclosed. The operating device has an operating means to open and close a windowpane, which comprises three discrete operating zones.

In the automatic mode, if the windowpane has been completely opened or closed, when contacting a given operating zone the windowpane is moved in advantageous manner into the position it was before it has been completely opened or closed. In this context it is disadvantageous that only the last position of the windowpane can be re-approached. No preferred position, which eventually was recorded as defined, can be re-approached.

Furthermore, with known adjusting drives it is to be differentiated between a manual run and an automatic run. A manual run means insofar that the adjusting drive is only activated as long as the user actuates the switch. The automatic run means that the adjustment process is started by actuating a switch and is continued after releasing the switch, unless the adjustment process is stopped by a further switch actuation or by triggered protective functions.

It is disadvantageous with this mentioned state of the art that positioning of the mobile unit driven by an external force to an exact desired gap opening can be adjusted only with difficulties, as mostly the mobile unit driven by an external force moves very quickly. This makes several attempts necessary with each positioning of the desired gap opening, until this desired position is reached. For storing a gap opening then adjusted in this way and for positioning on a stored gap opening additional operating elements are required.

It is the object of the invention to indicate an economical and comfortable operation both for positioning a mobile part driven by an external force of a motor vehicle on a gap opening and a method for positioning a mobile unit in a motor vehicle, as well as a corresponding apparatus for implementing the method.

SUMMARY OF THE INVENTION

This object is solved by a method for positioning a mobile unit (2) in a motor vehicle. The mobile unit (2) is driven by an external force and is equipped with an electronic jamming protection device, a manual mode or an automatic mode can be chosen and positioning of the mobile unit (2) is effected between two final positions (E1, E2), wherein the final positions are predefined by the type of the design of the mobile unit (2) in its guide mechanism (7), and positioning can be performed via at least one input unit (T). The positioning of the mobile unit (2) is effected via the input unit (T) and this position (5) then occupied of the mobile unit (2) is automatically stored, the stored position (5) can be automatically approached by user request. A region (B1, B2) is defined between the final positions (E1, E2), wherein the region (B1, B2) is smaller than the distance of the final positions (E1, E2), the occupied position (5) is stored automatically only if the occupied position (5) lies in the predefined region (B1, B2), and the occupied position (5) is stored automatically only if the occupied position (5) is maintained longer than a predefined time. Advantageous embodiments in the invention will become apparent with the description and the figures.

It is advantageous with the invention of the applicant that a gap opening once set and tediously adjusted by the user of the mobile unit driven by an external force, in particular of a window of a motor vehicle, e.g. for an optimal outlet of cigarette smoke, or, however, for an optimal ventilation of the vehicle interior, can be effected in easy way and with only one switch operating unit. Furthermore, it is advantageous that no additional operating elements, except the ever since already available switches, are required.

There are different kinds of embodiment of such switches. For example single-stage duplex switches are known, which work as follows: a manual run is initiated, if the switch is actuated only for a short time. An automatic run is initiated, if the switch is actuated for a longer time. Another variant is that the automatic run is initiated, if the switch is actuated only for a short time, whereas the manual run, if the switch is actuated over longer time.

Furthermore, double-stage or two-stage duplex switches are known. Here, the manual run is initiated, if the first stage of the switch is actuated, the automatic run, if the second stage of the switch is actuated.

In accordance with the invention with the method for positioning the mobile unit driven by an external force in a motor vehicle the position of the mobile unit to be moved is monitored on the basis of the evaluation of the ripples of the current of the electric motor, via which the mobile unit driven by an external force is moved in a guide mechanism. If the mobile unit driven by an external force reaches one of its normally two final positions, which is for example the complete closing position or the maximum opening position, if virtually the block position is reached, these final positions are taught in on a one time basis. The system then automatically recognizes these positions. Each further position within the two final positions can now be approached by a user by means of an operating unit, i.e. the initially described switch in the motor vehicle. Furthermore, a jamming protection device is realized, which recognizes a jamming situation on the basis of the evaluation of the path of the current and which reverses or stops the system accordingly. In this way jamming can be prevented.

The mobile unit driven by an external force is in particular a window, a sun roof, a rising roof, a door or a sliding door at/in a motor vehicle. Also a rear flap which can be closed automatically or a trunk lid are included here.

For implementing the method furthermore an electric motor and a control unit are provided, wherein the mobile unit driven by an external force is moved by the electric motor, mostly via mechanical means.

The electric motor mostly is connected via two switches to an operating voltage and to a reference potential (earth) via a resistance, wherein always one switch is connected in direction to the operating voltage and one switch in direction to the reference potential (earth). For switching off the electric motor both switches are shunt to the reference potential (earth), so that at the electric motor the motor tension is zero. A shunt resistance to measure the current is integrated into the power supply/current path of the supply of the electric motor. On the basis of this current measurement the connected microcomputer unit, which simultaneously controls the movement of the mobile unit driven by an external force, can evaluate the current ripples and can trigger the electric motor accordingly. Furthermore, a tactile input unit is provided, which is implemented in an advantageous embodiment as a switch for a window lift in single- or two-stage form. Via this tactile unit a user controls the functionality of the mobile unit driven by an external force.

For better comprehensibility of the invention the latter is described in the following on the basis of a concrete example of embodiment based on a side window of a motor vehicle with a window lift driven by an external force.

If a user moves the windowpane with the motor vehicle window lift driven by an external force via the manual run or in the automatic run in direction of the upper window sealing, then the current position of the windowpane is continuously monitored. This is effected, as mentioned, by evaluating the current ripples. The position of the windowpane is determined by the control unit on the basis of the current ripples.

When reaching the sealing position, i.e. the position of the windowpane, in which the jamming protection device is to be deactivated, so that the windowpane can approach the final position with defined force, the control unit deactivates the jamming protection after the teach-in phase. Furthermore, now the user is able to approach via the tactile input unit each desired position between the final positions of the windowpane, the maximum opening of the window and the position of the closed window. The control unit is able to move the windowpane by means of the window lift to any position between the two final positions of the windowpane. However, for the user to approach an opening position of the windowpane in defined manner, the control unit stores the position of the windowpane, at which the latter was adjusted for a longer time. This automatically stored position can then be approached again in the future. In a further advantageous embodiment of the invention the control unit stores the position of the windowpane only if this position was set for a longer time and if this position lies within a defined region.

Thus, for example an exhaust region is provided as a defined region and the occupied position is stored as an exhaust position for the purpose of exhausting the vehicle interior, if the occupied position lies within the exhaust region. This region comprises for example the upper 5 cm below the upper stop. In a further advantageous embodiment of the invention there is a further tactile input element, which when being activated stores the currently approached position of the windowpane. Storage takes place in the control unit or in the advantageous embodiment in a storage unit assigned to the control unit.

The automatic positioning on the stored position is effected with an ensuing actuation of the tactile unit, wherein the latter is embodied as a single- or two-stage duplex switch or also as a simple switch.

In case of a single-stage duplex switch the stored position is automatically approached, if the duplex switch is short-term actuated in direction of the stored position of the mobile unit based on the current position of the mobile unit.

Thus the following possible features result

Overall Operating Pattern 1:

If the duplex switch is actuated in the direction, related to the momentary position of the mobile unit, of the stored position, then the stored position is approached, if the duration of actuation is smaller than for example 1 second. If the switch is actuated longer than this time, for example 1 second, the final position is automatically approached beyond the stored position. If the switch is kept pressed for a still longer time, i.e. for example longer than 2 seconds, it is changed into the manual operation, in which adjustment is continued, until the switch is released or the final position is reached, respectively.

Operating Pattern 2: Start in the Upper Stop Position

If the mobile unit stands in its upper stop position at the beginning of actuating the duplex switch and the duplex switch is short-term actuated (between 10 ms and 500 ms) in the lower direction, then the stored position is approached. If the duplex switch is actuated for a period of time between 500 ms and 2 s, then the drive is driven only for the time of the switch activation. If the switch activation time is over 2 seconds, then the drive is continued to be driven downwards even after activation of the switch until either the switch is re-activated or the lower stop position is reached.

Operating Pattern 3: Start in the Lower Stop Position

If the mobile unit stands in its lowest stop position at the beginning of activating the duplex switch or in the lower soft stop position and the duplex switch is short-term activated (between 10 ms and 500 ms) in the upper direction, then the stored position is approached. If the duplex switch is activated for a period of time between 500 ms and 2 s, then the drive is driven only for the time of the switch activation. If the switch activation time is over 2 seconds, then the drive is continued to be driven upwards even after activation of the switch until either the switch is re-activated or the upper stop position is reached.

Operating Pattern 4: Start Between the Upper and Lower Stop Position

If the mobile unit stands neither in the upper nor in the lower stop position at the beginning of activating the duplex switch and the duplex switch is short-term activated (between 10 ms and 500 ms), then the drive is driven only for the time of the switch activation. If the duplex switch for is activated for a period of time between 500 ms and 2 s, then the drive is driven only for the time of the switch activation. If the switch activation time is over 2 seconds, then the drive is continued to be driven upwards even after activation of the switch until either the switch is re-activated or the upper stop position E1 is reached.

Hence, with a two-stage duplex switch for example it is actuated only very shortly either in stage 1 or stage 2 in direction of the stored position of the windowpane. In this case the control unit drives the windowpane into this pre-stored position. In case of a two-stage duplex switch this position is approached, if the latter is actuated very shortly either in the first or second stage in direction of the stored position and at the same time the current position is distant from the stored position only a certain degree. In case of a single-stage duplex switch the latter is actuated only very shortly in direction of the stored position and the current position is distant from the stored position only a certain degree.

If the window is completely closed and if a two-stage duplex switch is provided, then the latter is short-term actuated either in stage 1 or 2 in direction of opening, then the control unit approaches the pre-stored position.

If the window is opened completely and a two-stage duplex switch is actuated only very shortly either in stage 1 or 2 in direction of closing, then the pre-stored position is equally approached.

If the window is completely closed and if a single-stage duplex switch is used and the latter is actuated only very shortly in direction of opening, then the pre-stored position is approached.

If the window is completely opened and a single-stage duplex switch is used, and if the latter is actuated very shortly in direction of closing, then the control unit drives the windowpane into the pre-stored position.

In a further advantageous embodiment of the invention unit it can be chosen from several stored positions via a further tactile input. When actuating this tactile input unit then the chosen position is approached.

Storage of the chosen position of the windowpane is effected either, as initially described, by maintaining this position for a longer period of time, for example for 5 minutes or longer, or by the fact that this position is distant from the closing position of the windowpane not more than one percentage related to the maximum opening way of the windowpane. It has proven to be advantageous in particular with smokers for the outlet of smoke from the motor vehicle to chose such an opening position in the region of 5% of the total opening way of the windowpane. This position can be stored, as is initially described. Further, in an advantageous embodiment of the invention, such positions are already stored in predefined manner in a storage unit, which is assigned to the control unit. This storage unit can accordingly be exchanged, or the storage regions can be overwritten, it is also possible to implement this storage unit as a first-in-last-out storage. In a further advantageous embodiment of the invention it is provided that a receiving duct for a storage medium is available, on which the appropriate positions of the windowpane can be stored. Furthermore, on this unit also further positions for the driver can be stored, such as for example the seat position. In advantageous manner this storage unit is integrated into the key of the motor vehicle or into the storage unit, respectively, in such a manner that it is retrievable via an ID-code in the key, which is connected to a control unit in the motor vehicle. In this way corresponding positions, which are assigned to each driver, can be stored and a driver can transfer his personal set data also when changing the vehicle. The storage unit is embodied in advantageous manner as a storage card, in particular an SD-Card, multimediacard or also as a storage unit with radio interface, such as IR interface or blue tooth interface and the data to be stored are transferred by radio to the control unit or from the control unit. Thus, a user can use his position data for seat, mirror, and windowpane position also with another vehicle.

BRIEF DESCRIPTION OF THE DRAWINGS

In the following now the invention is described with a concrete example of embodiment on the basis of a window lift for a motor vehicle, in which.

DETAILED DESCRIPTION OF THE DRAWINGS

Figure 1:
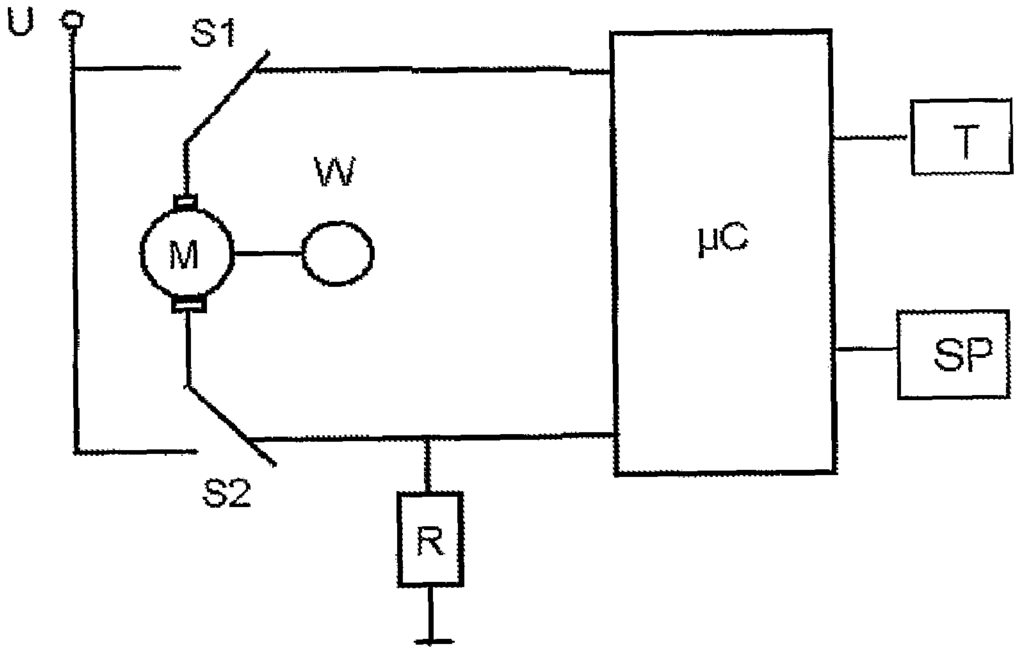
FIG. 1 shows a schematic switching arrangement for controlling a window lift of a motor vehicle and FIG. 2 shows a schematic functionality of the invention on the basis of a windowpane in a vehicle door.

In FIG. 1 a schematic switching arrangement for controlling a window lift in a motor vehicle is shown, wherein only elements required for the comprehensibility of the invention are shown. A motor vehicle window lift system driven by an external force consists of an electric motor M and an associated motor control unit μC. The electric motor M is connected via two switches 51, S2 to the operating voltage U on the one hand and to earth via a resistance R on the other hand. For switching the electric motor M off both switches S1 and S2 are shunt to earth. A precision resistor not shown, in the following referred to as shunt, is provided in the current path of the electric motor M, via which by means of a current measuring device, which is equally not shown, the motor control unit μC monitors the motor current and based on the ripples of the motor current the position of the window is deduced, which is moved by the window lift. On the basis of these current ripples the motor control unit μC continuously determines the position of the windowpane.

In a further embodiment of the invention the electric motor M comprises a magnet wheel and one or also two associated Hall-sensors. The output of the Hall-sensors is directly connected to the motor control unit μC. On the basis the signals of the Hall-sensor the motor control unit μP determines the position of the windowpane.

Figure 2:
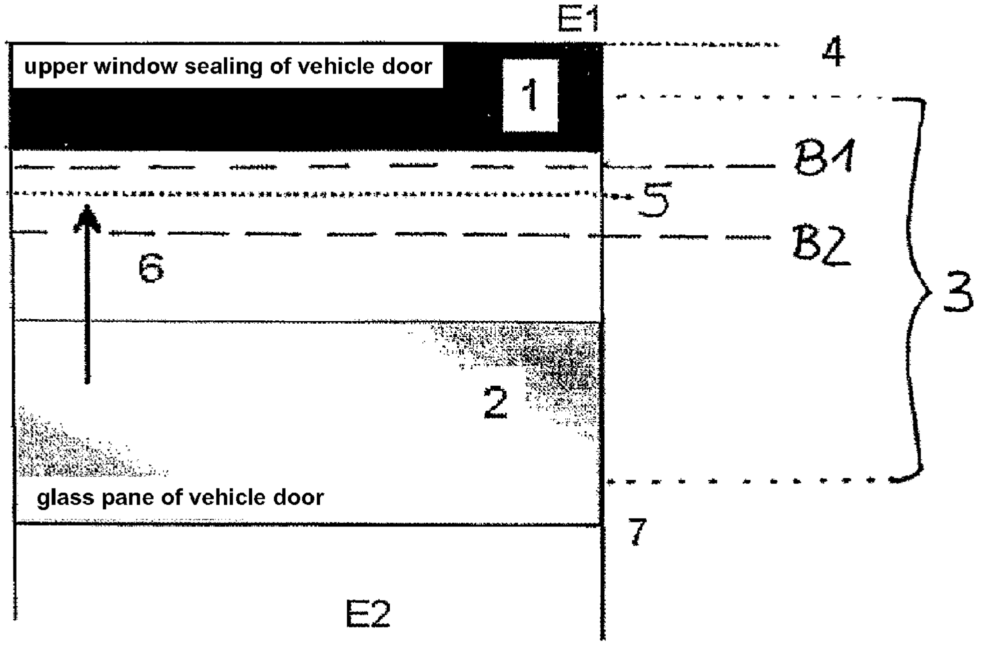

In FIG. 2 the schematic functionality of the invention is shown on the basis of a vehicle windowpane in a vehicle door.

There are two modes for a user to actuate the window lift. There is the automatic mode, in which the windowpane 2 is completely opened or closed and the motor control unit μC automatically completely closes or opens the windowpane 2 while taking into consideration the jamming protection. When closing in the automatic mode the windowpane 2 would be driven for a given period of time with increased motor power into the upper position 4 when exceeding the jamming protection position 3 and reaching the upper position 4. If in the manual mode the user moves the windowpane 2 by the motor vehicle window lift driven by an external force in direction to the upper window sealing 1 and the upper final position E1, or downwards in direction to the lower final position E2, then the current position of the windowpane is continuously determined by the motor control unit μC. Furthermore, as is shown in FIG. 2, a tactile input unit T and in advantageous embodiment of the invention a storage unit SP is associated to the motor control unit μC.

Via this tactile input unit T, which in preferable embodiment is a switch, in particular a switch in form of a two-stage duplex switch or a single-stage duplex switch, a user controls the window lift system.

Now if a user adjusts the windowpane via the tactile input unit T to a position, shown in FIG. 2 with reference symbols 5 within the exhaust region B1-B2, and if he leaves it unchanged over a longer time, then the motor control unit μC stores this position in the storage unit SP. The storage unit SP is an external storage unit, a storage unit integrated into the motor control unit or a storage unit, which is located at any position in the motor vehicle and is connected to the motor control unit μC.

This stored position 5 of the windowpane 2 can now be re-approached by a user of the system at any later point of time. Depending on the used switch this is effected as follows:

If the tactile input unit T is embodied as single-stage duplex switch, then a manual run is initiated, if the switch is actuated only for a short time. An automatic run is initiated, if the switch is actuated for a longer time. Another variant is that the automatic run is initiated, if the switch is actuated only for a short time, the manual run, however, if the switch is actuated over a longer time.

When embodying the tactile unit T as a double-stage or two-stage duplex switch the manual run is initiated, if the first stage of switch is actuated, the automatic run, if the second stage of the switch is actuated. In case of a two-stage duplex switch it is actuated only very shortly either in stage 1 or stage 2 in direction of the stored position of the windowpane. In this case the control unit drives the windowpane into this pre-stored position. In case of a two-stage duplex switch this position is approached, if the latter is actuated only very shortly either into the first or second stage in direction of the stored position and at the same time the current position is distant from the stored position only a certain degree. In case of a single-stage duplex switch the latter is actuated only very shortly in direction of the stored position and the current position is distant from the stored position only a certain degree.

If the windowpane is 2 completely closed and if a two-stage duplex switch is provided, the latter is actuated very shortly either in stage 1 or 2 in direction of opening, then the control unit μC approaches the pre-stored position.

If the windowpane 2 is opened completely and a two-stage duplex switch is actuated only very shortly either in stage 1 or 2 in direction of closing, then the pre-stored position is equally approached.

If the windowpane is 2 completely closed and if a single-stage duplex switch is used and the latter is actuated only very shortly in direction of opening, then the pre-stored position is approached.

If the windowpane 2 is completely opened and a single-stage duplex switch is used, and if the latter is actuated only very shortly in direction of closing, then the control unit μC drives the windowpane 2 into the pre-stored position.

In a further embodiment of the invention the tactile input unit T is not only embodied in form of a single-stage or two-stage duplex switch, but there are several functional input units, via which further positions can be stored in defined manner. Thus, in an advantageous embodiment of the invention a user can occupy these given storage regions with window positions, assigned to each individual window in the vehicle.

This has the advantage that for example in a smoker vehicle the user can adjust the window position in such optimal way that this results in an optimal air exchange and that he can adjust accordingly the air and the opening of the window to his needs. As it has proven, each user has a specifically desired position for this "smoker gap" and wishes to have repeatedly retrievable a once set position 5. By the invention of the applicant it is ensured that this position can be stored.

In a preferred embodiment the storage unit SP is an exchangeable storage.

In a further embodiment of the invention the tactile input element is replaced by a speech control system. Here, the functions of the window lift system are controlled by voice entries of the user.

Finally, it is also considered to integrate the tactile input element into a remote control, in particular a radio remote control.

The invention claimed is:

1. A method for positioning a mobile unit (2) in a motor vehicle, the method comprising:

- driving a mobile unit (2) in one of a manual mode and an automatic mode, with an external force provided by a motor (M), wherein the mobile unit (2) is equipped with an electronic jamming protection device;
- driving the mobile unit (2) with increased motor power when the mobile unit (2) exceeds a jamming protection position defined by the electronic jamming protection device for the mobile unit (2) and when the mobile unit (2) is operated in the automatic mode;
- positioning the mobile unit (2) between two final positions (El, E2), wherein the final positions are predefined by a guide mechanism (7) of the mobile unit (2) and positioning can be performed via at least one input unit (T);
- automatically storing an occupied position (5) of the mobile unit (2) in a storage unit (SP), wherein the stored occupied position (5) can be automatically approached by user request, a region (B1, B2) is defined between the final positions (E1, E2), wherein the region (B1, B2) is smaller than the distance of the final positions (El, E2), and the occupied position (5) is stored automatically when the occupied position (5) lies in the predefined region (B1, B2), and when the occupied position (5) is maintained longer than a predefined time;

selecting one of the manual mode and the automatic mode based upon a period of time the input unit (T) is actuated; and positioning of the mobile unit (2) via the input unit (T) to one of the stored position (5) and the two final positions (El, E2) by user request when in automatic mode based upon the period of time the input unit (T) is actuated.

2. A method according to claim 1, wherein the stored position (5) is automatically approached by an appropriate actuation of the input unit (T) only if the mobile unit (2) is currently distant from the stored position (5) only a given degree or is located within a given region.

3. A method according to claim 1, wherein if the input unit (T) is a single-stage duplex switch, the stored position (5) is automatically approached, and if the duplex switch is short-term actuated in direction of the stored position (5) of the mobile unit (2) based on the current position of the mobile unit (2).

4. A method according to claim 1, wherein if the input unit (T) is a two-stage duplex switch the stored position (5) is automatically approached, and if the switch is short-term actuated in the first or second stage in direction of the stored position (5) of the mobile unit (2) based on the current position of the mobile unit (2).

5. A method according to claim 1, wherein the stored position (5) is automatically approached, if the mobile unit is in the lower final position (E2) and the input unit (T) is short-term actuated in direction of closing.

6. A method according to claim 1, wherein the stored position (5) is automatically approached, if the mobile unit is in the upper final position (El) and the input unit (T) is short-time actuated in direction of opening.

7. A method according to claim 1, wherein the mobile unit (2) is a windowpane driven by an external force and that between two final positions (E1, E2) an exhaust region (B1, B2) is provided and that the occupied position is stored as an exhaust position for the purpose of exhausting the vehicle interior, if the occupied position lies within the exhaust region.

8. The method of claim 1, further comprising determining the position of the mobile unit (2) with a motor control unit (IJP) and measuring a current from the motor (M) to continuously determine the position of the mobile unit (2).

9. The method of claim 1, further comprising determining the position of the mobile unit (2) with a motor control unit (IJP) and measuring a current from the motor (M) to continuously determine the position of the mobile unit (2).

10. The method of claim 1, wherein the mobile unit (2) is a windowpane for a vehicle and further comprising positioning the at least mobile unit (2) via a second input unit (T), wherein each the second mobile unit (2) is another windowpane for the vehicle.

11. An apparatus for positioning a mobile unit (2) in a motor vehicle comprising:

a control unit (μP) operable in one of an automatic and a manual mode;

an input unit (T);

a mobile unit (2);

an unit (M) for moving the mobile unit (2); and a storage unit for storing an occupied position, wherein wherein the control unit (μP) comprises means to verify and to automatically store the occupied position (5)

when the occupied position (5) is in a predefined region (B1, B2), wherein the region (B1, B2) is defined between the final positions (E1, E2) and is smaller than the distance of the final positions (El, E2), and when the occupied position (5) is maintained longer than a predefined time; and wherein one of the automatic and the manual mode is selected based upon a predetermined actuation time for the input unit (T) and wherein the mobile unit (2) is positioned in one of the stored position (5) and the two final positions (E1, E2) by user request when in automatic mode based upon the period of time the input unit (T) is actuated.

12. An apparatus according to claim 11, wherein the mobile unit (2) is a windowpane, a sliding door, a sun roof or a rear flap or a trunk lid of a motor vehicle.

13. An apparatus according to claim 11, wherein the input unit (T) is a tactile unit, or a speech input unit or a remote control unit.

14. An apparatus according to claim 13, wherein the tactile input unit (T) is a switch, in particular a single-stage or two-stage duplex switch.

15. The apparatus of claim 11, further comprising an electronic jamming protection device for the mobile unit (2), wherein the mobile unit (2) is driven with increased power from the unit (M) when the mobile unit (2) exceeds a jamming protection position defined by the electronic jamming protection device and when the mobile unit is operated in the automatic mode.

16. The apparatus of claim 11, further comprising at least one resistor located in the current path of the motor (M), wherein a current from the motor (M) is measured with the resistor to continuously determine the position of the at least mobile unit (2).

17. The apparatus of claim 11, further comprising a magnet and at least one Hall effect sensor for the motor (M) wherein a distance between the magnet and the at least one Hall effect sensor is measured to determine the position of the at least mobile unit (2).

18. The apparatus of claim 11, wherein the mobile unit (2) is one of a plurality of windowpanes for the vehicle and wherein each of the plurality of windowpanes from the vehicle corresponds with one of a plurality of input units (T).

19. A method for positioning at least one mobile unit (2) in a vehicle comprising:

driving the at least mobile unit (2) in one of a manual mode and an automatic mode by an external force from a motor (M);

determining a position of the at least mobile unit (2) with a motor control unit (μP);

positioning the at least mobile unit (2) via at least one input unit (T), wherein the mobile unit (2) is positioned between two final positions (E1, E2) predefined by a design of a guide mechanism (7) of the at least mobile unit (2);

automatically storing an occupied position (5) of the at least mobile unit (2) in a storage unit (SP), when the occupied position (5) lies in a predefined region (B1, B2) and when the occupied position (5) is maintained longer than a predefined time; wherein the predefined region (B1, B2) is defined between and is smaller than the distance of the final positions (E1, E2); and selecting one of the manual mode and the automatic mode based upon a period of time the input unit (T) is actuated;

driving the at least mobile unit (2) to approach one of the stored position (5) and the two final positions (E1, E2) by user request when in automatic mode based upon the period of time the input unit (T) is actuated.

20. The method of claim 19, further comprising driving the mobile unit (2) with increased motor power when the mobile unit (2) exceeds a jamming protection position defined by a electronic jamming protection device for the mobile unit (2) and when the mobile unit (2) is operated in the automatic mode.

21. The method of claim 19, wherein determining the position of the at least mobile unit (2) with a motor control unit (IJP) further comprises measuring a current from the motor (M) to continuously determine the position of the at least mobile unit (2).

22. The method of claim 19, wherein determining the position of the at least mobile unit (2) with a motor control unit (IJP) further comprises measuring a position of the at least mobile unit (2) with a magnet and at least one Hall effect sensor for the motor (M).

23. The method of claim 19, wherein the at least mobile unit (2) is one of a plurality of mobile units (2) and further comprising positioning each of the plurality of mobile units (2) each with a corresponding one of a plurality of input units (T), wherein each of the plurality of mobile units (2) corresponds to windowpane for the vehicle.

* * * * *